(12) United States Patent
Krishnan et al.

(10) Patent No.: US 11,710,103 B2
(45) Date of Patent: Jul. 25, 2023

(54) INTRUSION SECURITY PANEL WITH REMOTE ASSISTANCE THROUGH SIMULATED USER INTERFACE

(71) Applicant: CARRIER CORPORATION, Palm Beach Gardens, FL (US)

(72) Inventors: Anantha Krishnan, Hyderabad (IN); Michael Ramoutar, Westford, MA (US); Ramesh Babu, Hyderabad (IN); Prakash Bodla, Hyderabad (IN)

(73) Assignee: Carrier Corporation, Palm Beach Gardens, FL (US)

( * ) Notice: Subject to any disclaimer, the term of this patent is extended or adjusted under 35 U.S.C. 154(b) by 351 days.

(21) Appl. No.: 16/086,120

(22) PCT Filed: Mar. 15, 2017

(86) PCT No.: PCT/US2017/022426
§ 371 (c)(1),
(2) Date: Sep. 18, 2018

(87) PCT Pub. No.: WO2017/165166
PCT Pub. Date: Sep. 28, 2017

(65) Prior Publication Data
US 2020/0311693 A1     Oct. 1, 2020

Related U.S. Application Data

(60) Provisional application No. 62/310,960, filed on Mar. 21, 2016.

(51) Int. Cl.
*G06Q 10/20* (2023.01)
*G06F 21/30* (2013.01)
(Continued)

(52) U.S. Cl.
CPC ............. *G06Q 10/20* (2013.01); *G06F 21/30* (2013.01); *G08B 25/14* (2013.01); *H04L 5/14* (2013.01)

(58) Field of Classification Search
CPC ........ G06Q 10/20; G06F 21/30; G08B 25/14; H04L 5/14
See application file for complete search history.

(56) References Cited

U.S. PATENT DOCUMENTS

| 5,579,221 A | 11/1996 | Mun |
| 6,182,094 B1 | 1/2001 | Humpleman et al. |

(Continued)

FOREIGN PATENT DOCUMENTS

| AU | 2006202299 A1 | 6/2006 |
| CN | 101808204 A | 8/2010 |

(Continued)

OTHER PUBLICATIONS www.techhive.com/article/2864494/sagehome automation and security system-uses your tv and smartphone or tablet as control-panels.html.

(Continued)

*Primary Examiner* — Jan P Mincarelli
(74) *Attorney, Agent, or Firm* — Bachman & LaPointe, P.C.

(57) ABSTRACT

A security system includes a security panel operable to communicate with a support site via a lightweight binary-based protocol to echo a security panel user interface with the support site. A method of communicating with a security system including communicating with a support site via a lightweight binary-based protocol to echo a security panel user interface at the support site.

13 Claims, 4 Drawing Sheets

(51) Int. Cl.
*G08B 25/14* (2006.01)
*H04L 5/14* (2006.01)

(56) References Cited

U.S. PATENT DOCUMENTS

| | | | |
|---|---|---|---|
| 6,263,503 | B1 | 7/2001 | Margulis |
| 6,313,872 | B1 | 11/2001 | Borg |
| 6,658,091 | B1 | 12/2003 | Naidoo et al. |
| 6,661,340 | B1 | 12/2003 | Saylor et al. |
| 6,792,323 | B2 | 9/2004 | Krzyzanowski et al. |
| 6,888,459 | B2 | 5/2005 | Stilp |
| 7,496,627 | B2 | 2/2009 | Moorer et al. |
| 7,516,470 | B2 | 4/2009 | Russ et al. |
| 7,668,120 | B2 | 2/2010 | Kolar |
| 7,693,608 | B2 | 4/2010 | Nasle |
| 7,786,891 | B2 | 8/2010 | Owens et al. |
| 7,792,920 | B2 | 9/2010 | Istvan et al. |
| 7,825,796 | B1 * | 11/2010 | Simon ............... G08B 25/14 340/3.3 |
| 8,042,048 | B2 | 10/2011 | Wilson et al. |
| 8,073,921 | B2 | 12/2011 | Thomas et al. |
| 8,166,498 | B2 | 4/2012 | Walter |
| 8,200,778 | B2 | 6/2012 | Edwards et al. |
| 8,218,080 | B2 | 7/2012 | Xu et al. |
| 8,321,885 | B2 | 11/2012 | Pino, Jr. et al. |
| 8,397,264 | B2 | 3/2013 | Ansari et al. |
| 8,516,087 | B2 | 8/2013 | Wilson et al. |
| 8,593,995 | B1 | 11/2013 | Christie, IV |
| 8,780,199 | B2 | 7/2014 | Mimar |
| 8,819,757 | B2 | 8/2014 | Rivera |
| 9,026,648 | B1 | 5/2015 | Slavin |
| 9,119,236 | B1 | 8/2015 | Martin |
| 9,142,214 | B2 | 9/2015 | Scalisi |
| 2003/0078677 | A1 | 4/2003 | Hull et al. |
| 2003/0097452 | A1 | 5/2003 | Kim et al. |
| 2005/0125083 | A1 | 6/2005 | Kiko |
| 2005/0267605 | A1 | 12/2005 | Lee et al. |
| 2005/0289613 | A1 | 12/2005 | Lawrence |
| 2006/0053196 | A1 | 3/2006 | Spataro et al. |
| 2006/0294565 | A1 | 12/2006 | Walter |
| 2008/0055423 | A1 | 3/2008 | Ying et al. |
| 2008/0270612 | A1 * | 10/2008 | Malakapalli ......... H04L 63/029 709/227 |
| 2010/0023865 | A1 | 1/2010 | Fulker et al. |
| 2010/0168931 | A1 | 7/2010 | Nasle |
| 2010/0192191 | A1 | 7/2010 | Wern |
| 2010/0277300 | A1 | 11/2010 | Cohn et al. |
| 2011/0032423 | A1 | 2/2011 | Jing et al. |
| 2011/0211069 | A1 | 9/2011 | Sybesma |
| 2012/0066608 | A1 | 3/2012 | Sundermeyer et al. |
| 2012/0096503 | A1 | 4/2012 | Slothouber et al. |
| 2012/0154138 | A1 * | 6/2012 | Cohn ................ G08B 25/004 340/501 |
| 2012/0169487 | A1 | 7/2012 | Poder |
| 2012/0291068 | A1 | 11/2012 | Khushoo et al. |
| 2013/0063241 | A1 | 3/2013 | Simon |
| 2014/0136379 | A1 | 5/2014 | Smith et al. |
| 2014/0233584 | A1 | 8/2014 | Lin et al. |
| 2014/0359101 | A1 | 12/2014 | Dawes et al. |
| 2015/0160623 | A1 | 6/2015 | Holley |
| 2015/0161875 | A1 | 6/2015 | Cohn et al. |
| 2015/0187192 | A1 | 7/2015 | Tabe |
| 2015/0244814 | A1 * | 8/2015 | Khalatian ............ H04L 67/141 715/753 |
| 2016/0019763 | A1 * | 1/2016 | Raji ................. G08B 19/005 340/506 |
| 2016/0036944 | A1 | 2/2016 | Kitchen et al. |

FOREIGN PATENT DOCUMENTS

| | | |
|---|---|---|
| CN | 102665120 A | 9/2012 |
| CN | 202587255 U | 12/2012 |
| CN | 103313037 A | 9/2013 |
| CN | 203243452 U | 10/2013 |
| CN | 103384320 A | 11/2013 |
| CN | 203883931 U | 10/2014 |
| DE | 202011004996 U1 | 3/2012 |
| EP | 1246401 A1 | 10/2002 |
| EP | 2261874 A1 | 12/2010 |
| FR | 2934703 A1 | 2/2010 |
| GB | 2397190 A | 7/2004 |
| TW | 546592 B | 8/2003 |
| WO | 0072596 A1 | 11/2000 |
| WO | 2006088263 A2 | 8/2006 |
| WO | 2007068957 A2 | 6/2007 |
| WO | 2007129145 A2 | 11/2007 |
| WO | 2009042581 A1 | 4/2009 |
| WO | 2011143273 A1 | 11/2011 |
| WO | WO-2012071642 A1 * | 6/2012 ........... G08B 25/012 |
| WO | 2015134520 A1 | 9/2015 |

OTHER PUBLICATIONS www.xfinity.com/home.cecurity.html, "XFINITY Home. A total home security and automation solution".
titanalarm.net/self-installation, Security System Self Installation in Phoenix, AZ, titanalarm.net/self-installation.
www.livewatch.com/how-it-works,Everything You Need to Know to Keep Your Home Safe, Brinks Home Security.
International Search Report dated Jun. 19, 2017 for PCT/US2017/021495 for corresponding U.S. Appl. No. 16/086,118.
International Search Report dated Jun. 19, 2017 for PCT/US2017/022426.

* cited by examiner

INTRUSION SECURITY PANEL WITH REMOTE ASSISTANCE THROUGH SIMULATED USER INTERFACE

BACKGROUND

The present disclosure relates to a security system and, more particularly, to a security system that pairs an intrusion security panel with a lightweight binary-based protocol to achieve screen echoing even on relatively low bandwidth channels.

Intrusion security panels are electronic control devices that are primarily used to supervise residence and, office premises to report intrusion and/or access events to a user and/or monitoring stations. Trained installers are required to visit the premises during the installation process and to configure Security Pane accessories such as Home Appliances, Camera or mobile interfaces devices. For adding ad hoc/newly purchased post installed devices to the security panel, or troubleshooting issues, installer presence is required to be on the premises. These installer visits may increase time and cost to the company and end user.

SUMMARY

A security system according to one disclosed non-limiting embodiment of the present disclosure can include a security panel operable to communicate with a support site via a lightweight binary-based protocol to echo a security panel user interface at the support site.

A further embodiment of the present disclosure may include providing communication between the security panel and the support site.

A further embodiment of the present disclosure may include a two-way voice communication between the security panel and the support site.

A further embodiment of the present disclosure may include authorizing access by the support site prior to echoing a security panel user interface at the support site.

A further embodiment of the present disclosure may include authorizing access by the support site via authorization on the security panel itself.

A method of communicating with a security system, the method according to one disclosed non-limiting embodiment of the present disclosure can include communicating with a support site via a lightweight binary-based protocol to echo a security panel user interface at the support site.

A further embodiment of the present disclosure may include providing two-way voice communication between the security panel and the support site.

A further embodiment of the present disclosure may include authorizing access by the support site prior to echoing a security panel user interface at the support site.

A further embodiment of the present disclosure may include authorizing access by the support site via authorization on the security panel itself.

A method of communicating with a security system, the method according to one disclosed non-limiting embodiment of the present disclosure can include authorizing access for a support site on a security panel itself prior to echoing a security panel user interface at the support site.

A further embodiment of the present disclosure may include communicating with the support site via a lightweight binary-based protocol to echo the security panel user interface at the support site.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
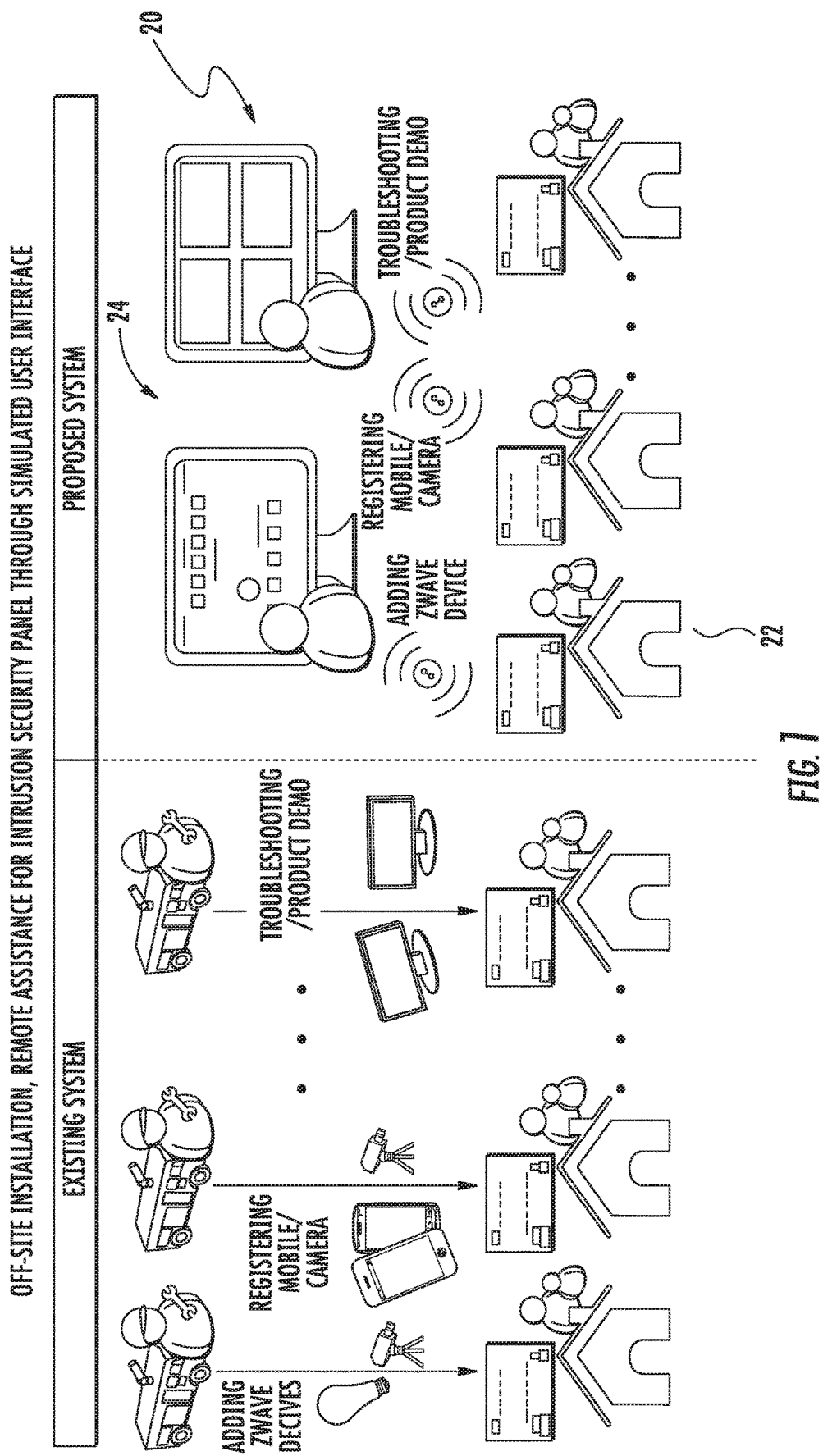
FIG. 1 is a schematic view of a security system according to one disclosed non-limiting embodiment.

FIG. 1 schematically illustrates a security system 20. The security system 20 may generally include a security panel 22 and a support site 24. It should be appreciated that the security panel 22 may be an intrusion security panel or form a potion thereof. It should be still further appreciated that although particular systems are separately defined, each or any of the systems may be otherwise combined or separated via hardware and/or software. The communication may be conveyed to one or more networks. For example, the communication may be transmitted to the Internet and/or a cellular network. The network(s) may include infrastructure that may be organized to facilitate cloud computing. For example, cloud computing may include one or more servers, such as a primary message server, a backup message server, etc.

Figure 2:
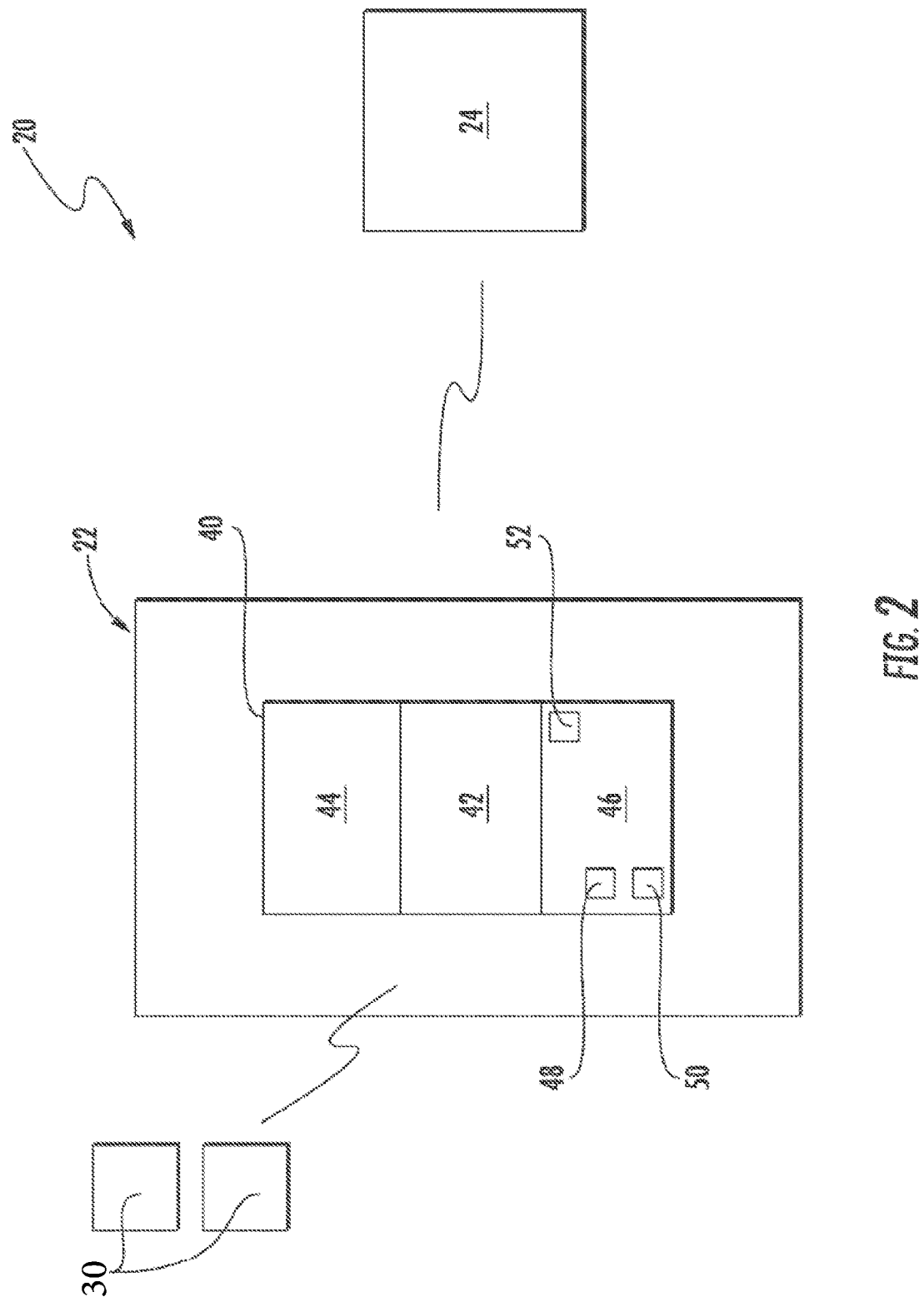
FIG. 2 is a block diagram of the security system.

With reference to FIG. 2, the security panel 22 generally includes a control module 40 with a processor 42, a memory 44, and an interface 46. The processor 42 may be any type of microprocessor having desired performance characteristics. The memory 44 may include any type of computer readable medium that stores the data and executable instructions 48 described herein below. The executable instructions may be stored or organized in any manner and at any level of abstraction, such as in connection with one or more applications 48, processes, routines, procedures, methods, etc. The memory 44 may also store data 50 that, for example, includes an access code validation engine 52, a device identifier, or any other type of data. The access code validation engine 52 is the authorization code that disables sensors 30 reporting to the security panel 22 to disarm the security system 20. The processor 42 may execute the instructions stored in the memory 44 that are operative on the data 50. The processor 42 may be coupled to the interface 46 that may include one or more of a keyboard or keypad, a touchscreen or touch panel, a display screen, a microphone, a speaker, etc. The interface 46 may also support a graphical user interface (GUI) and/or voice-to-text capabilities.

Figure 3:
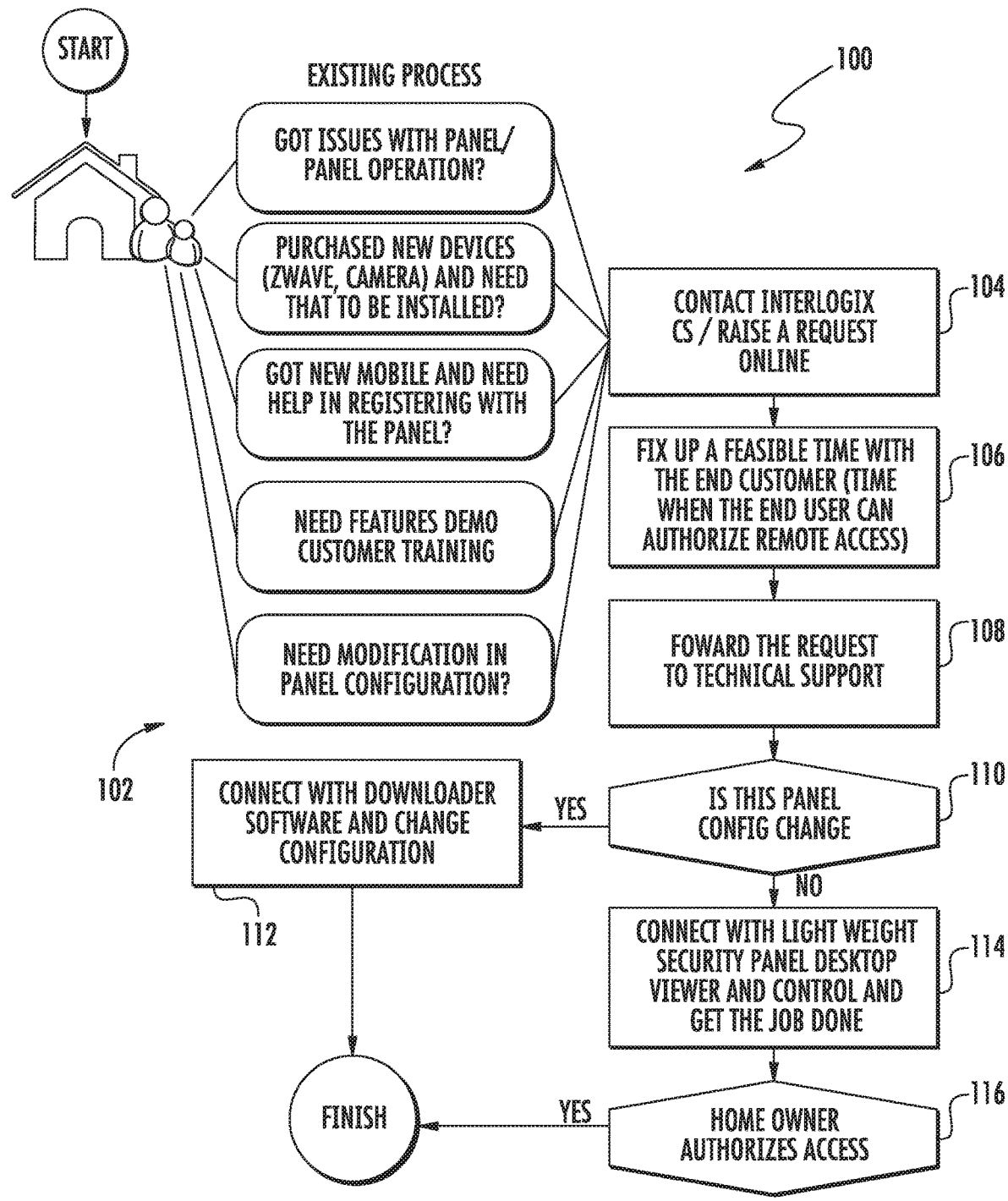
FIG. 3 is a block diagram for an operational use case of the security system according to one disclosed non-limiting embodiment.

With reference to FIG. 3, a method 100 for operation of the security system 20 is disclosed in terms of functional block diagrams. It should be appreciated that these functions may be enacted in either dedicated hardware circuitry or programmed software routines capable of execution in various microprocessor based electronics control embodiments.

In one embodiment, issue resolution over a technical support call may become complicated if the issue has multiple causes and the end user is not able to provide relevant and complete information. Initially, installer presence has heretofore been required to add an ad hoc purchase of a lifestyle device such as a Z-Wave device for smart home automations, cameras, registering an end user mobile phone, diagnostics/trouble shooting, panel demos/training to an end user, and/or changing panel configurations (step 102). The end user therefor submits a technical support request to a technical support member (steps 104, 106, 108). It should be appreciated that various methods may be utilized to initiate such contact, e.g., telephone, Internet, etc.

Figure 4:
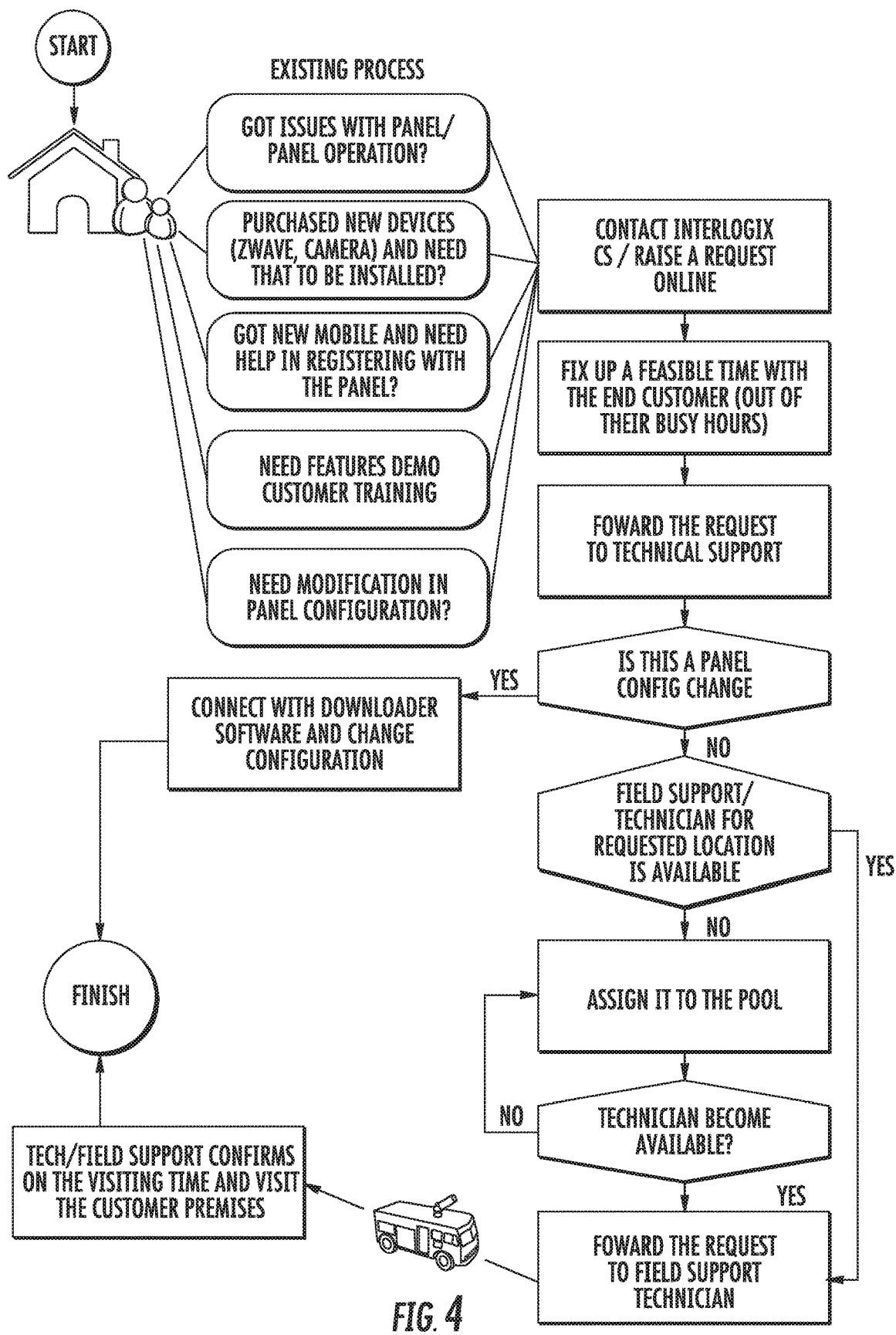
FIG. 4 is a block diagram for a PRIOR ART operational use case.

Next, the request is determined to be, or not to be, a panel configuration change (step 110). A panel configuration change permits direct connect with downloader as conventionally understood (step 112; FIG. 4 PRIOR ART).

Should the request be determined to not be a panel configuration change, the connection is performed via a light weight security panel desktop viewer and control to permit support personnel to configure the ad hoc/newly purchased devices to the intrusion security panel operating from the support site 24 (step 114). The technical support personnel can then remotely connect, view, and control the security panel 22 user interface, after the technical support personnel access is authorized on the security panel 22 by the home owner (step 116). That is, the authorization is performed on the security panel 22 itself to maintain security.

The panel user interface is then echoed at the support site 24 using client software utilizing, for example, a lightweight binary-based protocol. That is, the support personnel at the support site 24 see exactly that on the security panel 22. The security panel 22 may also provide two-way voice can further facilitate audible commentary when technician is connected. This protocol facilitates screen IDs, Event IDs, UI control IDs, sensor State IDs, events, and other information to be displayed in the client software that is a replica of that of the actual security panel 22. This protocol facilitates new device installation, troubleshooting, security panel features demonstration, newly purchased z-wave device, assisting novice users on setting up a new zip code for a weather/traffic app etc., without installer presence in the end user premises. The data being exchanged between the panel and the client software is controlled to a compact size by the binary protocol that Deals mainly with IDs instead of entire screen data, in order to achieve the screen echoing even on relatively low bandwidth channels.

The client application running in the support site is a thick client application which has all the screens and layout coded in and just waits for the events and messages to achieve the screen echoing. This ensures the screen reflection is achieved on low bandwidth networks. The events and messages from the panel will be passed over the communication bridge/path that is already present in the cloud or any other infrastructure that can facilitate to bridge the control panel and the remote application connectivity. Since the installer visits are avoided and small operations are being handled from the support site, one technician can probably see multiple panel screens on his screen and can give assistance thus save time and work parallel on multiple issues. The use cases like adding a zwave device, camera and mobile devices are just few choices we have quoted and the use cases should be expanded to operations which can be done on security and life style from the support site.

The elements disclosed and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, dynamically loaded or updated modules, or any combination of these, and all such implementations may be within the scope of the present disclosure.

It should be appreciated that like reference numerals identify corresponding or similar elements throughout the several drawings. It should also be appreciated that although a particular component arrangement is disclosed in the illustrated embodiment, other arrangements will benefit herefrom.

Although the different non-limiting embodiments have specific illustrated components, the embodiments are not limited to those particular combinations. It is possible to use some of the components or features from any of the non-limiting embodiments in combination with features or components from any of the other non-limiting embodiments.

Although particular step sequences are shown, disclosed, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically disclosed. For that reason the appended claims should be studied to determine true scope and content.

What is claimed is:

1. A security system, comprising:
  a security panel operable to receive a request and to determine whether the request is a panel configuration change or is not a panel configuration change, and when the request is determined to not be a panel configuration change, the security panel is configured to communicate with a support site via a lightweight binary-based protocol, and to echo a security panel user interface at the support site after access by the support site is authorized on the security panel in order that support personnel at the support site see what is shown on the security panel user interface, wherein the security panel is operable to provide two-way voice communication between the security panel and the support site.

2. The system as recited in claim 1, wherein access by the support site is manually authorized on the security panel.

3. The system as recited in claim 1, further comprising authorizing access by the support site via authorization on the security panel itself.

4. A method of communicating with a security system, the method comprising:
  receiving a request from a security panel of the security system;

determining whether the request is or is not a panel configuration change;

when the request is not a panel configuration change,
authorizing access for a support site on the security panel itself prior to echoing a security panel user interface at the support site;
communicating with the support site via a lightweight binary-based protocol;
echoing the security panel user interface at the support site in order that support personnel at the support site see what is shown on the security panel user interface, wherein the security panel is operable to provide two-way voice communication between the security panel and the support site; and
communicating between the security panel and the support site via the two-way voice communication, whereby the request can be addressed by the support personnel at the support site.

5. A method of communicating with a security system, the method comprising:
receiving a request from a security panel of the security system;
determining whether the request is or is not a panel configuration change;
when the request is not a panel configuration change,
authorizing access for a support site on a security panel itself;
echoing a security panel user interface at the support site in order that support personnel at the support site see what is shown on the security panel user interface; and
communicating with the support site via a lightweight binary-based protocol, wherein the security panel is operable to provide two-way voice communication between the security panel and the support site, wherein the lightweight binary-based protocol facilitates screen IDs, Event IDs, UI control IDs, and sensor state IDs, to be displayed in the client software that is a replica of the security panel wherein the data being exchanged between the security panel and the client software is controlled to a compact size via the lightweight binary-based protocol; and
communicating between the security panel and the support site via the two-way voice communication.

6. The system as recited in claim 1, wherein the lightweight binary-based protocol facilitates screen IDs, Event IDs, UI control IDs, and sensor state IDs, to be displayed in the client software that is a replica of the security panel wherein the data being exchanged between the security panel and the client software is controlled to a compact size via the lightweight binary-based protocol.

7. The method as recited in claim 4, wherein the lightweight binary-based protocol facilitates screen IDs, Event IDs, UI control IDs, and sensor state IDs, to be displayed in the client software that is a replica of the security panel wherein the data being exchanged between the security panel and the client software is controlled to a compact size via the lightweight binary-based protocol.

8. The system as recited in claim 1, wherein, the security panel is operable, when the request is determined to be a panel configuration change, to connect a user of the user interface with downloader software configured to make the panel configuration change.

9. The method as recited in claim 4, wherein, when the request is determined to be a panel configuration change, connecting a user of the user interface with downloader software configured to make the panel configuration change.

10. The method as recited in claim 5, wherein, when the request is determined to be a panel configuration change, connecting a user of the user interface with downloader software configured to make the panel configuration change.

11. The system as recited in claim 1, wherein data being exchanged between the security panel and the support station is controlled to a compact size by the binary protocol that deals mainly with IDs instead of entire screen data.

12. The method as recited in claim 4, wherein data being exchanged between the security panel and the support station is controlled to a compact size by the binary protocol that deals mainly with IDs instead of entire screen data.

13. The method as recited in claim 5, wherein data being exchanged between the security panel and the support station is controlled to a compact size by the binary protocol that deals mainly with IDs instead of entire screen data.

* * * * *